United States Patent
Vital et al.

(10) Patent No.: US 11,063,475 B1
(45) Date of Patent: Jul. 13, 2021

(54) POWER TRANSFER AND HARVESTING SYSTEM HAVING ANCHOR-SHAPED ANTENNAS

(71) Applicants: Dieff Vital, Miami, FL (US); John L. Volakis, Miami, FL (US); Shubhendu Bhardwaj, Miami, FL (US)

(72) Inventors: Dieff Vital, Miami, FL (US); John L. Volakis, Miami, FL (US); Shubhendu Bhardwaj, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/916,187

(22) Filed: Jun. 30, 2020

(51) Int. Cl.
| | | |
|---|---|---|
| H02J 50/20 | (2016.01) | |
| H01Q 1/36 | (2006.01) | |
| H02J 50/90 | (2016.01) | |
| H02J 50/00 | (2016.01) | |
| H04B 5/00 | (2006.01) | |

(52) U.S. Cl.
CPC ............... H02J 50/20 (2016.02); H01Q 1/36 (2013.01); H02J 50/001 (2020.01); H02J 50/90 (2016.02); H04B 5/00 (2013.01)

(58) Field of Classification Search
CPC .................................. H02J 50/00; H04B 5/00
USPC .................... 307/104; 343/700 R; 434/700 R
See application file for complete search history.

(56) References Cited

U.S. PATENT DOCUMENTS

| | | | | |
|---|---|---|---|---|
| 6,094,179 | A * | 7/2000 | Davidson ............... | H01Q 1/243 343/702 |
| 7,450,081 | B1 * | 11/2008 | Punnoose ................ | H01Q 1/36 343/797 |
| 8,945,111 | B2 * | 2/2015 | Brannan ............ | A61B 18/1815 606/33 |
| 10,186,913 | B2 * | 1/2019 | Leabman ................ | H02J 7/025 |
| 2015/0042533 | A1 * | 2/2015 | Cheng ...................... | H01Q 1/36 343/817 |
| 2016/0181868 | A1 * | 6/2016 | Casse ..................... | H01Q 1/248 307/104 |
| 2017/0149145 | A1 * | 5/2017 | Payne ...................... | H01Q 1/36 |
| 2020/0067352 | A1 * | 2/2020 | Kothari ................... | H02J 50/27 |

* cited by examiner

*Primary Examiner* — Adi Amrany
(74) *Attorney, Agent, or Firm* — Saliwanchik, Lloyd & Eisenschenk

(57) ABSTRACT

A wireless power transfer and harvesting system that can be integrated with fabric is provided. The wireless power transfer and harvesting system includes a transmitter antenna for wirelessly transferring power and a receiver antenna operatively coupled to the transmitter antenna for receiving the power. At least one of the transmitter antenna and the receiver antenna can be formed with a shape of an anchor to inhibit effects of lateral and/or angular positional misalignments of the transmitter antenna or the receiver antenna upon power transfer efficiency of the system.

16 Claims, 13 Drawing Sheets

(a) System level block diagram (b) Practical examples of the use

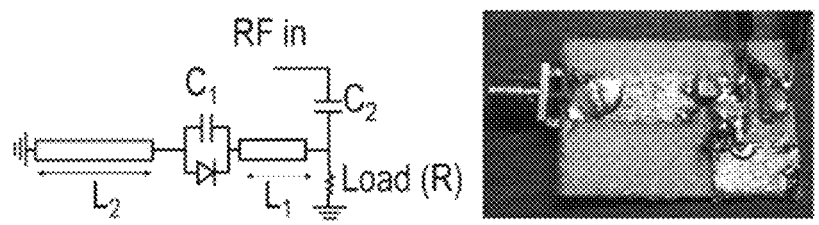
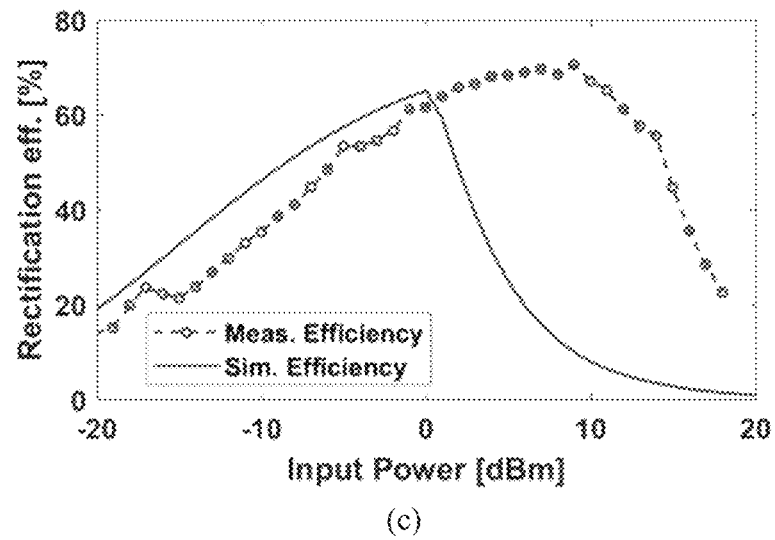
Figures 2(a)-2(c)
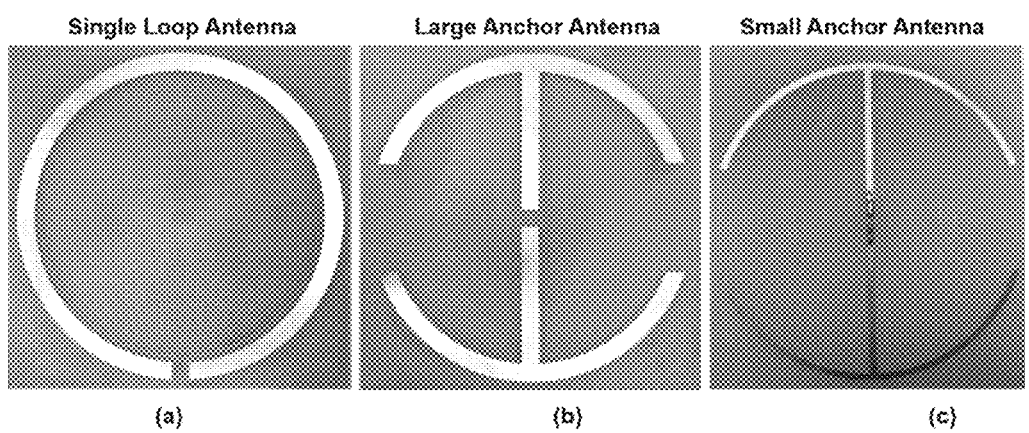
Figures 3(a)-3(c)

POWER TRANSFER AND HARVESTING SYSTEM HAVING ANCHOR-SHAPED ANTENNAS

BACKGROUND

Traditional near-field antenna designs consist of single or multiple turns of wires wirelessly coupled to a similar antenna structure positioned in the near-field of the first antenna. In prior works, researchers have attempted to increase the coupling distance between the transmitter and the receiver, which is of practical relevance.

To achieve this purpose, intermediate helical-coils, positioned between the transmitter and receiver resonators, was proposed. This topology leads to strongly coupled magnetic resonance. It has been shown that the helical-structure can be replaced by a simpler, parasitic metallic loop. An extension of this topology, a multiple loop excitation strategy was investigated, where intermediate loops were not parasitic but connected. Moreover, an extension of the strongly coupled system, where the transfer distance was increased to several loop-diameters by equally-spaced coupled resonators. In this work, the distance of coupling is extended by introducing several relay coils between the transmitter and receiver which has also a curved shape.

An important development among strong coupling type wireless power transfer (WPT) was the use of two-dimensional (2D) planar versions of the strongly coupled resonance, where the parasitic loop and the excited loop differ in radii, but are on a same plane. A cylindrically curved version of this configuration was proposed in which a power transfer was shown from different angular positions of the receiver antenna, but this was accomplished by using a cylindrically curved version of the antenna, making the antenna geometry a three-dimensional (3D) geometry, which is not suitable for planar antenna integration applications. Even if these structures help overcome the issue of antenna misalignments, their applications are limited since they cannot be employed in a system that requires planar structures or has a limitation in power consumption for using lumped components. Apart from the strongly coupled topology, it is worth noting that a metamaterial-based loading element can be used as an intermediate structure for efficiency enhancement for larger distances.

The influence of lateral and angular misalignments of antennas on the power transfer efficiency has been a great challenge for antenna design. Various investigations have been carried out to solve this issue. The issue of misalignment was addressed, where authors presented an analytical model for spiral and solenoid configurations that can help predict the performance of the power transfer system when it undergoes both lateral and angular misalignments. Other works addressed the problem of misalignment by using an electronic tuning circuit suitable for Class E inverter, an impedance compression network, and a T-model matching network, allowing obtaining a power transfer efficiency of 50% when the system undergoes a lateral misalignment of up to 70 cm. Several spatial configurations of antenna have also been proposed in order to overcome the misalignment issues. It has been shown that a 3D omni-directional power transfer system can achieve a power transfer efficiency of 60% regardless of the angular misalignments.

BRIEF SUMMARY

There continues to be a need in the art for improved designs of near-field antennas and associated techniques that are resilient to misalignments between the transmitter and the receiver antennas with respect to wireless power transfer efficiency.

Embodiments of the subject invention pertain to wireless power transfer and harvesting systems that can be integrated with fabric surfaces and are configured to have anchor-shaped antennas to inhibit effects of lateral or angular positional misalignments of the antennas upon the power transfer efficiency of the wireless power transfer and harvesting system.

In an embodiment, a wireless power transfer and harvesting system for wirelessly transferring and receiving electromagnetic power comprises at least one transmitter antenna or receiver antenna formed with a shape of an anchor and the wireless power transfer and harvesting system is integrated with fabric or textile material. The shape of an anchor can be configured to inhibit effects of lateral or angular positional misalignments of the transmitter antenna or the receiver antenna upon power transfer efficiency of the wireless power transfer and harvesting system.

In an embodiment, the anchor-shaped antenna of the wireless power transfer and harvesting system can comprise two semi-enclosing structures disposed diametrically opposite to each other and each semi-enclosing structure comprises a central bar extending from a middle portion of the corresponding semi-enclosing structure toward the opposite semi-enclosing structure. The two semi-enclosing structures may be formed as two semi-circular strips each having a central bar and may have a same shape and a same size. The two semi-enclosing structures are spaced apart from each other by a predetermined distance. The anchor-shaped antenna can be configured to have an extended fringing field extending outside an aperture of the antenna. The anchor-shaped antenna of the wireless power transfer and harvesting system is operated at about 350-400 megahertz (MHz).

In another embodiment, the anchor-shaped antenna of the wireless power transfer and harvesting system can comprise two semi-enclosing shapes disposed diametrically opposite to each other and each semi-enclosing structure comprises a central bar extending from a middle portion of the corresponding semi-enclosing structure toward the opposite semi-enclosing structure. The two semi-enclosing structures may be formed as two semi-circular strips each including a corrugated central bar having a plurality of corrugations formed along length of the central bar.

In another embodiment, the anchor-shaped antenna of the wireless power transfer and harvesting system can comprise two polygonal shapes disposed to face each other, each polygonal shape comprising a central bar extending from a middle portion of the corresponding polygonal shape toward the opposite polygonal shape. The two polygonal shapes may be of the same shape and a same size or different shapes and different sizes.

In an embodiment, an advantageous wearable power transferring system comprises a transmitter antenna that is or can be integrated with fabric or textile material and configured to transmit radio frequency (RF) energy within a desired frequency band; the transmitter antenna may or may not being formed with a shape of an anchor configured to inhibit effects of lateral or angular positional misalignments of the transmitter antenna upon power transfer efficiency of the wireless power transfer system.

In an embodiment, an advantageous wearable power harvesting system comprises a receiver antenna that is or can be integrated with fabric and configured to receive radio frequency (RF) energy within a desired frequency band, and a rectifier circuit converting received RF energy into a direct current (DC) energy, the receiver antenna may or may not being formed with a shape of an anchor configured to inhibit effects of lateral or angular positional misalignments of the receiver antenna upon power transfer efficiency of the wireless power harvesting system.

BRIEF DESCRIPTION OF DRAWINGS

FIG. 2(a) is a schematic representation of a low-profile rectifier circuit of the wireless power transfer system, according to an embodiment of the subject invention.

FIG. 2(b) shows an image of a prototype of the low-profile rectifier circuit of the wireless power transfer and harvesting system of FIG. 2(a), according to an embodiment of the subject invention.

FIG. 2(c) is a plot diagram showing performance results of the low-profile rectifier circuit of the wireless power transfer and harvesting system operating at a frequency of 2.45 GHz, according to an embodiment of the subject invention.

FIGS. 3(a)-(c) are schematic representations illustrating antennas of the wireless power transfer and harvesting system having various shapes, FIG. 3(a) showing an antenna having a shape of a single loop, FIG. 3(b) showing an antenna having a shape of a large anchor, and FIG. 3(c) showing an antenna having a shape of anchor of smaller size and thickness, according to an embodiment of the subject invention.

FIG. 4(b) showing an antenna having a lateral misalignment along the central bar structure wherein ΔY represents misalignment distance and g represents the normal distance between the two antennas when ΔY is set to zero, where g is measured along a line which is orthogonal to the two antenna-planes; FIG. 4(c) showing an antenna having an elevational angular misalignment wherein θ represents an elevation angle of the angular misalignment; and FIG. 4(d) showing an antenna having an azimuthal angular misalignment wherein φ represents an azimuth angle of the angular misalignment, according to an embodiment of the subject invention.

FIGS. 5(g) and (h) show the comparisons of performance results when the single-loop-shaped antenna and the anchor-shaped of antenna are operating at the same frequencies and the rotation axis of azimuthal and elevational planes is chosen to be 7.5 cm away from the center of the respective antennas for each of these cases. The inset figure in the bottom-left corner illustrates the choice of the rotation axis for the performance results shown in FIGS. 5(e)-(h), respectively.

DETAILED DESCRIPTION

Embodiments of the subject invention provide novel and advantageous wireless power transfer and harvesting systems including anchor-shaped antenna structures for inhibiting effects of lateral or angular (or both) positional misalignments of the antennas upon efficiencies of power transfer for wearable applications.

Figure 1A:
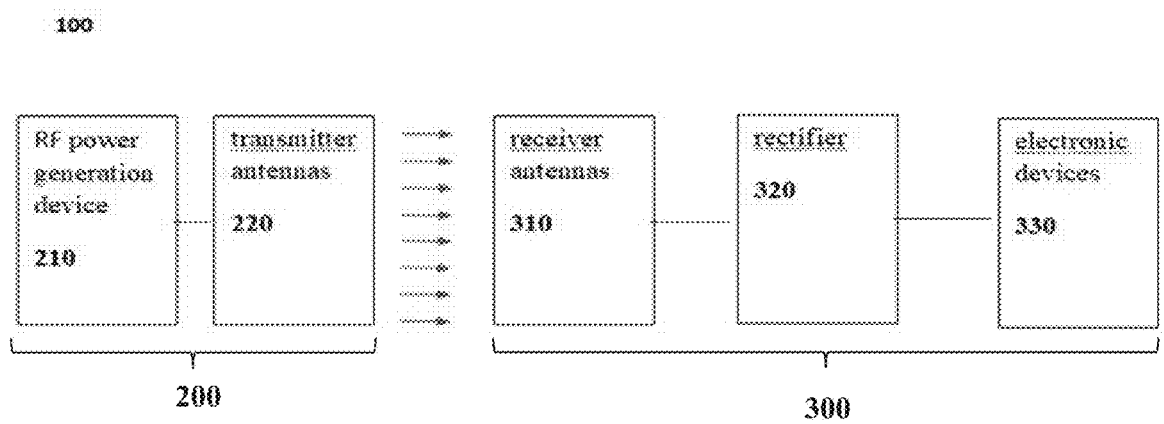
FIG. 1(a) is a block diagram representation of a wireless power transfer and harvesting system integrated into a fabric surface, according to an embodiment of the subject invention.

Wireless Power Transfer and Harvesting System Integratable into a Fabric Surface Referring to FIG. 1(a), a wireless power transfer and harvesting system 100 that can be integrated into a fabric surface comprises a transmitter unit 200 including a radio frequency (RF) power generation device 210 and one or more transmitter antennas 220 coupled to the RF power generation device 210, and a receiver unit 300 including one or more receiver antennas 310, a rectifier 320 coupled to the one or more receiver antennas 310, and one or more electronic devices 330 coupled to the rectifier 320. The RF power generation device 210 generating the RF power and supplying the RF power to the one or more transmitter antennas 220 which wirelessly transmits the RF power to the one or more receiver antennas 310. Upon receiving the RF power, the one or more receiver antennas 310 then supplies the RF power to the rectifier 320, such as a diode rectifier, to be converted into direct current (DC) power to empower one or more electronic devices 330. Moreover, a power management circuit (not shown) can be coupled to the rectifier 320 to regulate or stabilize any fluctuating DC power.

In one embodiment, the transmitter unit can be integrated into an item of furniture such as a chair, a bed, a mattress, a desk or a couch with the RF power generation device 210 being mounted on or embedded in the item of furniture while the one or more transmitter antennas 220 is integrated into the upholstery of the furniture such that a user of the item of furniture may be situated within the near-field of the transmitter antennas 220 to efficiently receive wireless power transferred from the item of furniture. Moreover, the one or more receiver antennas 310 can be integrated into fabric of clothing of the user, such as a back region of a shirt or a skirt for wirelessly receiving the power from transmitter antennas 220 integrated into the furniture in the proximity of the user.

The power management circuit may or may not be integrated into the fabric of clothing depending upon the size of the power management circuit. For example, a simplistic power management design comprising a Zener diode for voltage regulation can be used for power management. Such a power management circuit of a small size may be integrated into a textile surface of fabrics.

Figure 1B:
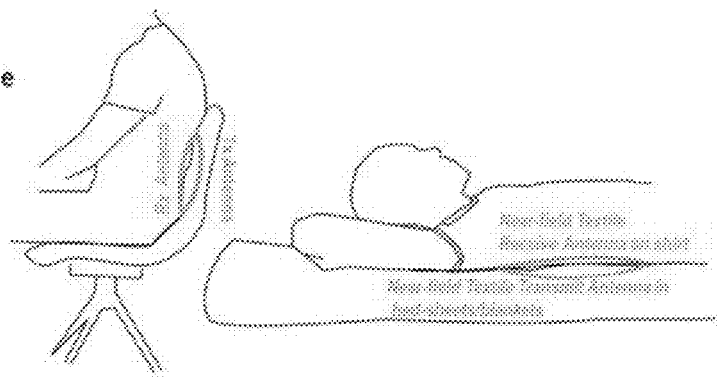
FIG. 1(b) is a schematic representation illustrating exemplary applications of the wireless power transfer and harvesting system of FIG. 1(a), according to an embodiment of the subject invention.

FIG. 1(b) shows several exemplary practical applications of the wireless power transfer and harvesting system 100 of FIG. 1(a). For example, a user wearing a shirt into which the one or more receiver antennas 310 are integrated may sit on a chair having upholstery into which the one or more transmitter antennas 220 are integrated. When the positions of the receiver antennas 310 are within a certain distance from the upholstery of the chair, the receiver antennas 310 in the user's shirt may receive the RF power wirelessly transferred by the transmitter antennas 220 integrated in the upholstery of the chair. The RF power is then converted to the DC-power by the rectifier 320 also integrated into the user's shirt to be supplied to the electronic device 330 which may be a rechargeable battery, a capacitor or supercapacitor, an internet of things (IoT) sensor, or a biomedical sensor.

In another example, a user wearing a shirt into which the one or more receiver antennas 310 are integrated may lie upon a bed sheet or a blanket of a bed into which one or more transmitter antennas 220 are integrated. When the positions of the receiver antennas 310 are within a certain distance from the bed sheet or the blanket, the receiver antennas 310 in the user's shirt may receive the RF power wirelessly transferred by the transmitter antennas 220 in the bed sheet or the blanket. The RF power is then converted to the DC-power by the rectifier 320 integrated into the user's shirt to be supplied to the electronic device 330 which may be a rechargeable battery, a capacitor and supercapacitor, an internet of things (IoT) sensor, or a biomedical sensor.

In one embodiment, the one or more transmitter antennas 220 and other suitable parts of a wireless power transfer and harvesting system 100 can be embroidered or screen printed into the textile of the upholstery, while the one or more receiver antennas 310 can be embroidered or screen printed to the item of clothing such as a shirt, a gown, a skirt or an apron.

In some embodiments, the transmitter unit 200 and/or the receiver unit 300 can be enclosed within a fabric enclosure. The fabric enclosure can be in addition to, or instead of, a fabric in which the transmitter unit 200 and/or the receiver unit 300 is integrated.

Rectifier Design

Referring to FIG. 2(a), a low-profile rectifier circuit 320 of the wireless power transfer and harvesting system 100 allows the conversion of the RF power signals into the DC power signals in order to operate devices such as body-worn sensors or other wearable electronic devices. The rectifier is capable of achieving high power (RF-to-DC conversion) efficiencies for low-input RF power levels (for example, below 1 mW). The circuit can be modelled based on resonant transmission lines where some of the resonant transmission lines are shorted at one end. The optimal position of the diode to enable the high power conversion efficiencies is adjusted by tuning the lengths of the transmission lines depending on the operation frequency. As a result, the power stored in a standing wave results in higher voltages across the diode terminals. The low-profile rectifier circuit 320 may be based on zero-biased diodes and capacitors to achieve high power efficiencies.

A prototype of the low-profile single-diode rectifier circuit 320 of FIG. 2(a) is shown in FIG. 2(b).

Referring to FIG. 2(c), performance results of the low-profile rectifier circuit of the wireless power transfer and harvesting system 100 operating at a frequency of 2.45 GHz are shown. It is noted that a RF-to-DC efficiency of 70% can be achieved by the low-profile rectifier circuit when it is seamlessly integrated into fabric, which is greater than the efficiency of 50% obtained by a general single-diode rectifying circuit. The low-profile rectifier circuit can be unobtrusively integrated with near-field or far-field antennas for power transfer and harvesting by being implemented into wearable form factors such as chairs, shirts, dress, mattress, curtains or bedsheets.

Since the positions of the one or more transmitter antennas 220, the one or more receiver antennas 310 or the rectifier 320 integrated into the fabrics may constantly change in real world applications, resilience of the power transfer efficiencies of the wireless power transfer and harvesting system 100 to the effects of either lateral or angular positional misalignments of the antennas is a crucial consideration for practical use such as continuously charging of wearable devices.

Anchor-Shaped Antenna Design

To inhibit the effects of lateral or angular positional misalignments of the antennas upon the power transfer efficiencies of the wireless power transfer and harvesting system 100, the transmitter antennas 220 or the receiver antennas 310 are formed to have an anchor shape, allowing fringing-fields and miniaturization of the antenna sizes. As a result, the extent of fields is increased and an extension of the range for high coupling efficiency is achieved.

FIG. 3(a) shows an antenna having a shape of a single loop, FIG. 3(b) shows an antenna having a shape of a large anchor, and FIG. 3(c) shows an antenna having a shape of anchor of smaller size and thickness. The frequency of operation of the antenna is controlled by changing the size of the anchor-shape and the width of the strip forming the anchor shape.

In one embodiment, the anchor-shaped antenna comprises two or more semi-enclosing structures ("crown"). When the anchor-shaped antenna has two semi-enclosing structures ("crown"), the two semi-enclosing structures can be diametrically disposed opposite to each other. Further, each semi-enclosing structure has a dipole-like central bar ("shank") extending from a middle portion of the semi-enclosing structure toward the opposite semi-enclosing structure. The two or more semi-enclosing structures are spaced apart from one another by gaps on diametrically opposite points, and therefore do not form a complete closure. Because of the gaps on the diametrically opposite points, the anchor-shaped antenna exhibits an extended fringing field which is not just localized across the aperture of the antenna, but also extended outside the aperture of the antenna.

In one embodiment, each semi-enclosing structure ("crown") is configured to have a semi-circular shape, a semi-square shape, a semi-polygon shape, or any other suitable shapes. These shapes provide similar extension of fields due to gaps of the diametrically opposite points.

The anchor-shaped antenna topologies formed with semi-enclosing structures and central-bar ("shank") structures as described above increases wavelength of the antenna-resonance, enabling an extension in the fringing electric fields. This fringing field effect is similar to a dipole antenna's fields. Further, over the aperture of the anchor-antenna, magnetic and electric fields both are responsible for coupling. Therefore, anchor-shaped antenna topologies provide combined advantages of loop antennas and dipole antennas, achieving both miniaturization and stronger fringing fields in the vicinity of the gaps of the topologies.

Therefore, the anchor-shaped antenna topologies facilitate resonant wireless power transmission and allow the antennas to operate in an inductive near-zone power transmission mode. Comparing to the conventional loop-shaped or dipole-shaped antennas, the anchor-shaped topologies offer significant advantages in inhibiting the effects of positional misalignments of the transmitter antenna or the receiver antenna upon the power transfer efficiency.

Figures 4A, 4B, 4C, 4D:
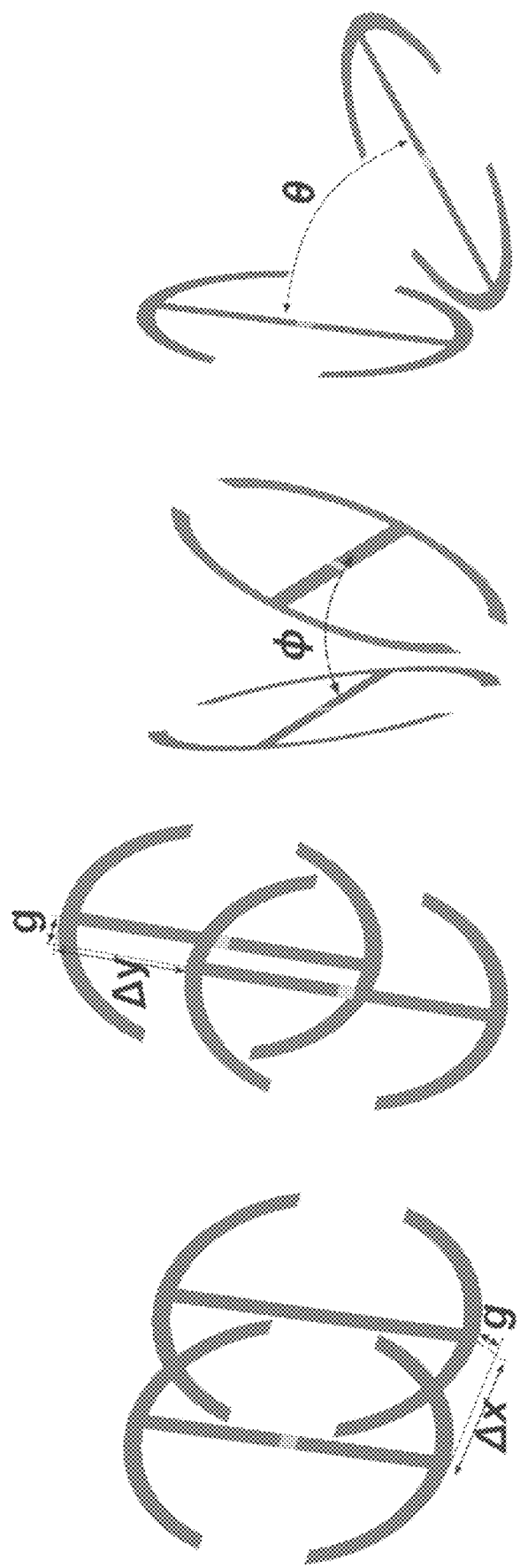
FIGS. 4(a)-(d) are schematic representations illustrating various positional misalignments between the receiver and transmitter anchor-shaped antennas of the wireless power transfer and harvesting system, FIG. 4(a) showing an antenna having a lateral misalignment wherein ΔX represents misalignment distance and g represents the normal distance between the two antennas when ΔX is set to zero, where g is measured along a line which is orthogonal to the two antenna-planes.

Four different degrees of freedom of positional misalignments are tested. Referring to FIGS. 4(a)-(d), various scenarios of misalignments of the anchor-shaped antenna are illustrated. In particular, FIG. 4(a) shows a lateral misalignment of the antenna, wherein ΔX represents the distance of lateral misalignment and g represents the normal distance between the two antennas; FIG. 4(b) shows a lateral misalignment of the antenna along the shank of the antenna, wherein ΔY represents the distance of lateral misalignment and g represents the normal distance between the two antennas; FIG. 4(c) shows an elevational angular misalignment of the antenna, wherein θ represents an elevation angle of the angular misalignment; and FIG. 4(d) shows an azimuthal angular misalignment of the antenna, wherein ϕ represents an azimuth angle of the misalignment.

Figures 5A, 5B, 5C, 5D, 5E, 5F, 5G, 5H:
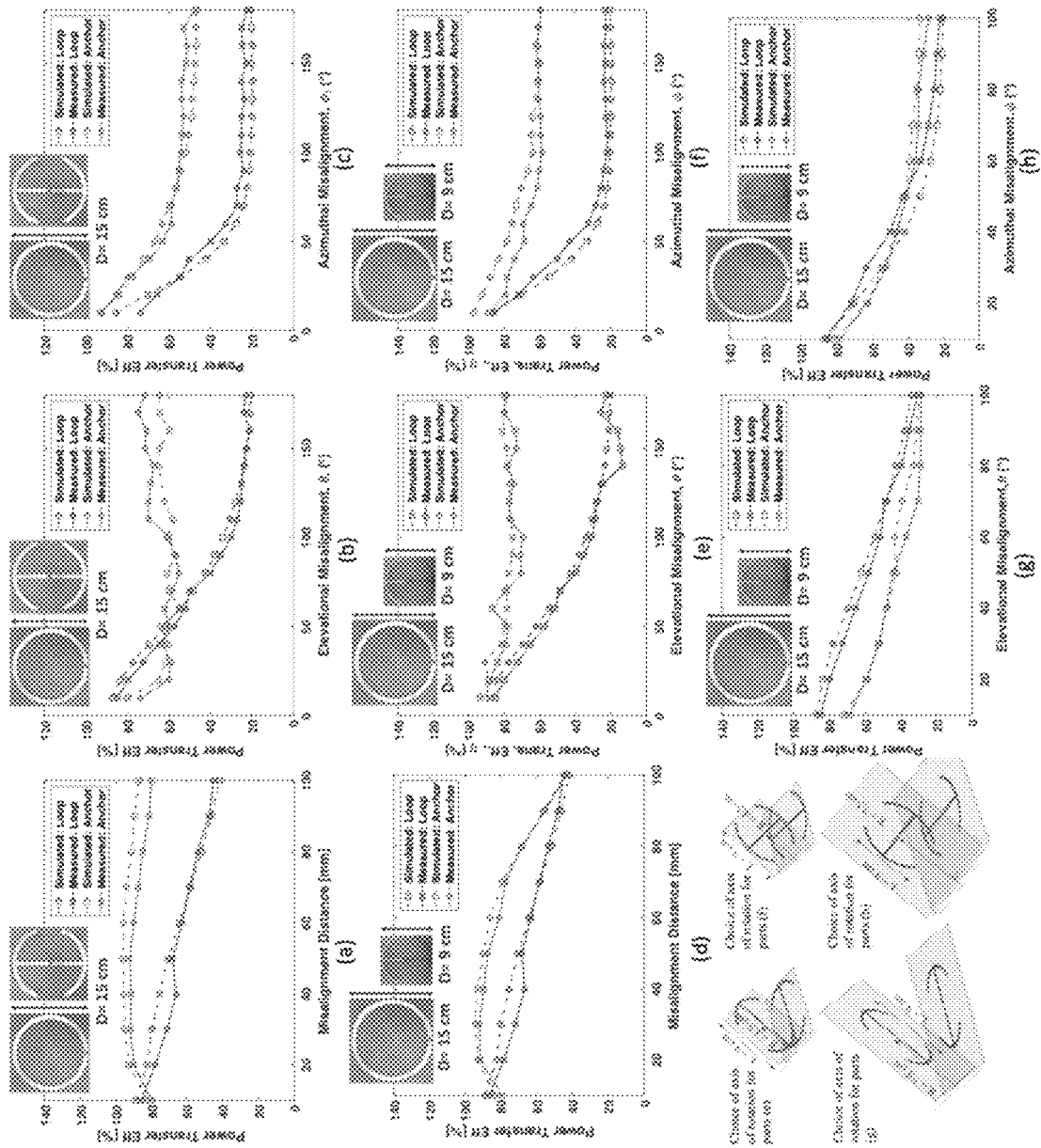
FIGS. 5(a)-(h) are plot diagrams showing comparisons of performance results of the antenna having a shape of a single loop with performance results of the antenna having a shape of anchor, FIGS. 5(a)-(c) showing the comparisons of performance results when the single-loop-shaped antenna and the anchor-shaped of antenna have a same diameter, and FIGS. 5(d)-(f) showing the comparisons of performance results when the single-loop-shaped antenna and the anchor-shaped of antenna are operated at a same operation frequency but have different diameters, according to an embodiment of the subject invention. In the performance results shown in FIGS. 5(e) and (f), the rotation-axis for respective antennas is chosen to be 7.5 cm for single-loop-antenna and 4.5 cm for anchor-shaped of antenna.
Figure 6A:
FIGS. 6(a)-(e) show photographs and images of prototypes of the wearable power transfer and harvesting system including the anchor-shaped antennas embedded in upholstery of a chair or dresses, according to an embodiment of the subject invention.
Figure 6B:
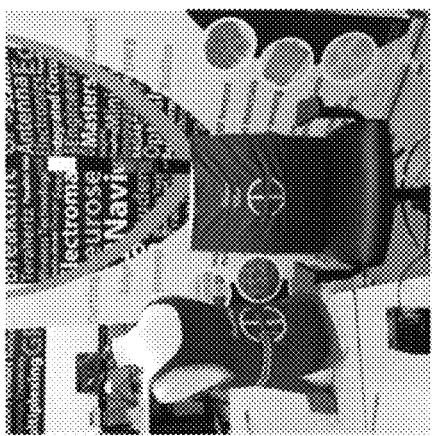
Figure 6C:
Figure 6D:
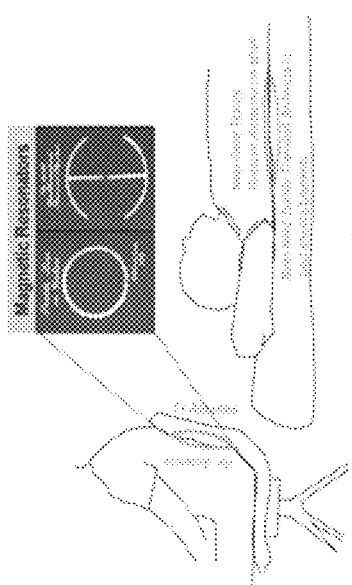
Figure 6E:

The comparisons of the power transfer efficiency of a conventional loop-shaped antenna and the power transfer efficiency of the anchor-shaped antennas of the embodiments of the subject invention are illustrated in FIGS. 5(a)-(h). In particular, FIGS. 5(a)-(c) show the comparison of the performance results of the loop-shaped antenna and an anchor-shaped antenna having a same diameter size D, while FIGS. 5(d)-(f) show the comparison of performance results of the loop-shaped antenna and an anchor antenna resonating at a same operational frequency. The diameters of the loop-shaped antenna and anchor antenna are different for the latter cases of FIGS. 5(d)-(f).

It is noted that when the anchor-shaped antenna and the loop-shaped antenna have the same diameter size, the anchor-shaped antenna will operate at a lower frequency (i.e. larger wavelength). D refers to the diameter of the antenna and is chosen to be, for example, about 15 cm for the anchor-shaped antenna of FIGS. 5(a)-(c). However, the resonant frequencies can be increased to a same range as that of the loop-shaped antenna by decreasing the size of the anchor antenna to about 9 cm for the cases shown in FIGS. 5(d)-(f). The diameter D of the conventional loop-shaped antenna is chosen to be, for example, about 15 cm for all cases. For measuring the azimuthal and elevational angular performances for the same frequency case, there could be two different choices of rotational axis. In FIGS. 5(e) and 5(f), the rotational axis for loop-shaped antenna is 7.5 cm away from the center, while for anchor shaped antenna, it is about 4.5 cm. This difference is due to the smaller size of the anchor antenna. Performance results are also shown for the case when the axis of rotation is assumed to be same for the two antennas and set to be 7.5 cm, as shown in the FIGS. 5(g) and (h). The differences in the choice of axis-rotation are illustrated in the bottom-left schematic graphs of FIG. 5.

For misalignment test results shown in FIGS. 5(a)-(f), the loop-shaped antenna is operated at a resonant frequency of about 600-700 MHz, while the anchor-shaped antenna is operated at a resonant frequency of about 350-400 MHz. For misalignment test results shown in FIGS. 5(g)-(h), each of the antennas are operating at a resonant frequency of about 600-700 MHz. These frequencies are inherent function of the geometry and size of the antennas.

As shown in FIGS. 5(a)-(f), in the broadside direction, i.e. when there is no positional misalignment, the loop-shaped antenna and the anchor-shaped antenna achieve similar power transfer efficiencies. On the other hand, when the misalignment is introduced and then increased in the three degrees of freedom, the loop-shaped antenna has a rapid decrease in the power transfer efficiency. In contrast, the power transfer efficiency of the anchor-shaped antenna is shown to be decreasing at a much slower rate than that of the loop-shaped antenna, demonstrating that the effect of positional misalignment upon the power transfer efficiency of the anchor-shaped antenna is inhibited. The size advantage of the anchor-shaped antenna is shown in FIGS. 5(g)-(h). As noted in these cases, the smaller anchor shaped antenna of 9 cm diameter provides equivalent performance as the larger loop-shaped antenna of 15 cm diameter.

Integration of the Anchor-Shaped Antennas into Fabric

In one embodiment, the anchor-shaped antennas are integrated into the upholstery of a chair and a dress operating at the same frequency as shown in FIGS. 6(a)-(e). To facilitate good performance in the antenna, certain parameters of the antenna are optimized for the conductive threads of the conductive surfaces of the prototype. A dedicated RF power source is provided to excite the transmitter antenna integrated into the upholstery of the chair and the RF power transmitted by the transmitter antenna is subsequently received by the received antenna integrated into the dress and converted into the DC power via the rectifying circuit. In the experiment, the collected DC power is measured to be about 2 mW when the transmitter antenna and the receiver antenna are placed about 20 cm away from each other. The power transferred is sufficient to light up three LEDs placed in parallel for validating the design.

Variants of the Anchor-Shaped Antenna

Referring to FIGS. 7(a)-(j), the anchor-shaped antenna can be configured to have various shapes of semi-enclosing strips ("crowns") and the dipole-like central bars ("shanks") for inhibiting the effects of lateral and angular positional misalignments upon the power transfer efficiencies.

FIG. 7 (a) shows an antenna having a generic anchor shape as described above.

FIG. 7 (b) shows an antenna having an anchor shape with a corrugated shank obtained by forming a plurality of corrugations along the central bar ("shank") of the anchor in order to slow the current circulating along the central bar and strengthen the magnetic field. In the experiments, the antenna formed with the corrugated shank is operated at the same frequency as the generic anchor-shaped antenna.

Figures 8A, 8B, 8C:
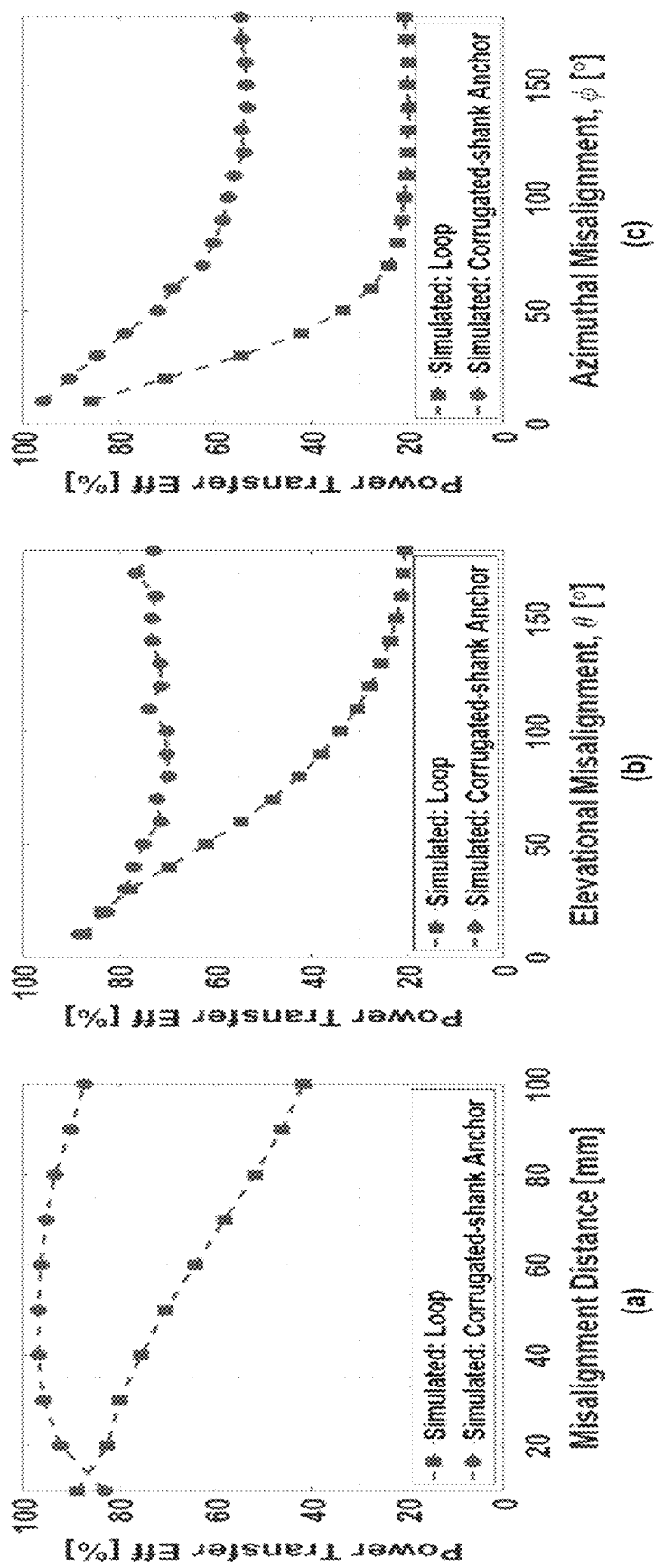
FIGS. 8(a)-(c) are plot diagrams showing comparisons of results of power transfer efficiency of the antenna having a shape of a single loop with the results of power transfer efficiency of the antenna having a shape of a corrugated-shank anchor under the effects of various lateral and angular positional misalignments, FIG. 8(a) showing the comparison of the results of power transfer efficiency of the antenna having a shape of a single loop with the results of power transfer efficiency of the antenna having a shape of a corrugated-shank anchor under the effects of a lateral misalignment, FIG. 8(b) showing the comparison of the results of power transfer efficiency of the antenna having a shape of a single loop with the results of power transfer efficiency of the antenna having a shape of a corrugated-shank anchor under the effects of an elevational angular misalignment, and FIG. 8(c) showing the comparison of the results of power transfer efficiency of the antenna having a shape of a single loop with the results of power transfer efficiency of the antenna having a shape of a corrugated-shank anchor under the effects of an azimuthal angular misalignment, according to an embodiment of the subject invention.

The results of the tests are shown in FIG. 8(a)-(c), indicating that the power transfer efficiencies of the antenna formed with the corrugated shank drop at rates much slower than that the conventional loop-shaped antenna, when either lateral misalignment, elevational angular misalignment, or azimuthal angular misalignment are introduced.

Figures 9A, 9B, 9C:
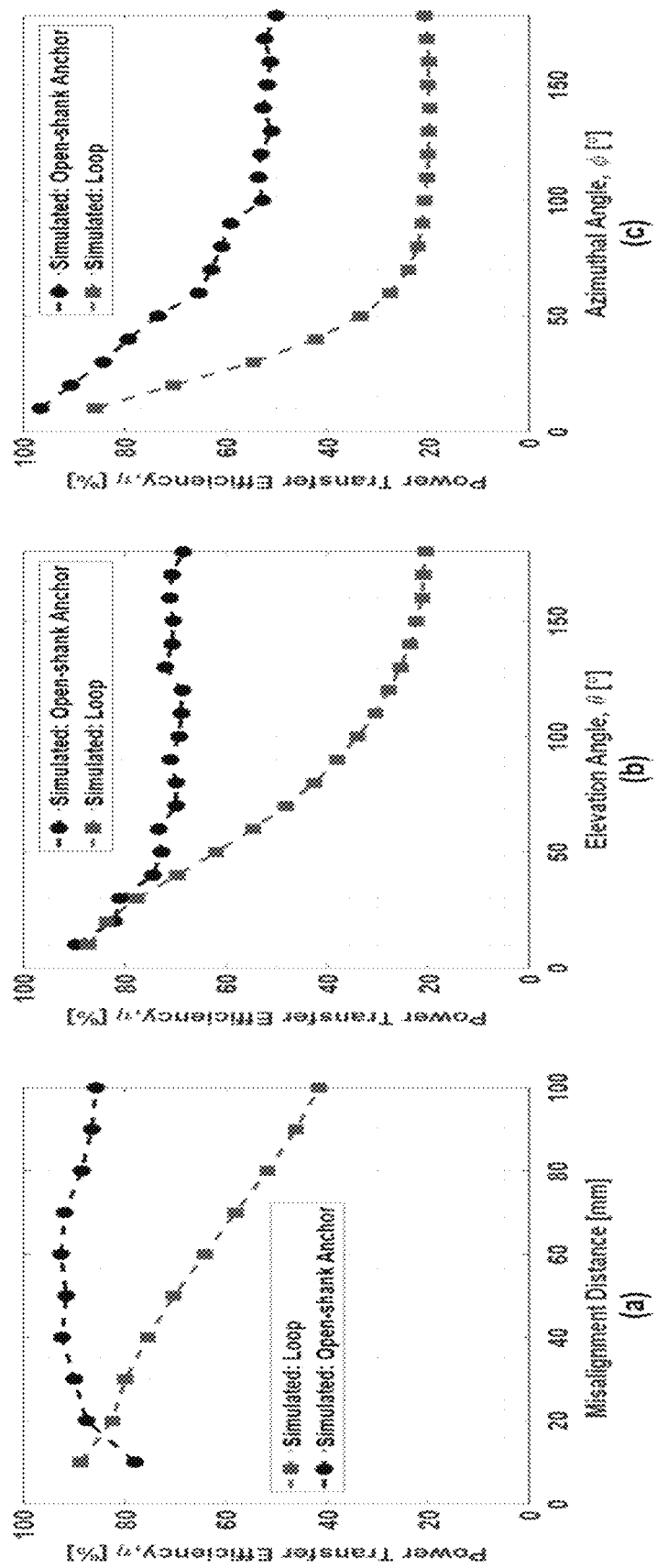
FIGS. 9(a)-(c) are diagrams showing comparisons of results of power transfer efficiency of the antenna having a shape of a single loop with the results of power transfer efficiency of the antenna having a shape of an open-shank anchor under the effects of various lateral and angular positional misalignments, FIG. 9(a) showing the comparison of the results of power transfer efficiency of the antenna having a shape of a single loop with the results of power transfer efficiency of the antenna having a shape of an open-shank anchor under the effects of a lateral misalignment, FIG. 9(b) showing the comparison of the results of power transfer efficiency of the antenna having a shape of a single loop with the results of power transfer efficiency of the antenna having a shape of an open-shank anchor under the effects of an elevational angular misalignment, and FIG. 9(c) showing the comparison of the results of power transfer efficiency of the antenna having a shape of a single loop with the results of power transfer efficiency of the antenna having a shape of an open-shank anchor under the effects of an azimuthal angular misalignment, according to an embodiment of the subject invention.

FIG. 7 (c) shows an antenna having an anchor shape with an open shank obtained by forming a fringe-enabling cavity at a distal end of the shank. The results of the misalignments tests are shown in FIG. 9(a)-(c), indicating that the power transfer efficiencies of the antenna formed with the open shank drop at rates much slower than that the conventional loop-shaped antenna, when either lateral misalignment, elevational angular misalignment, or azimuthal angular misalignment are introduced.

Figures 10A, 10B, 10C:
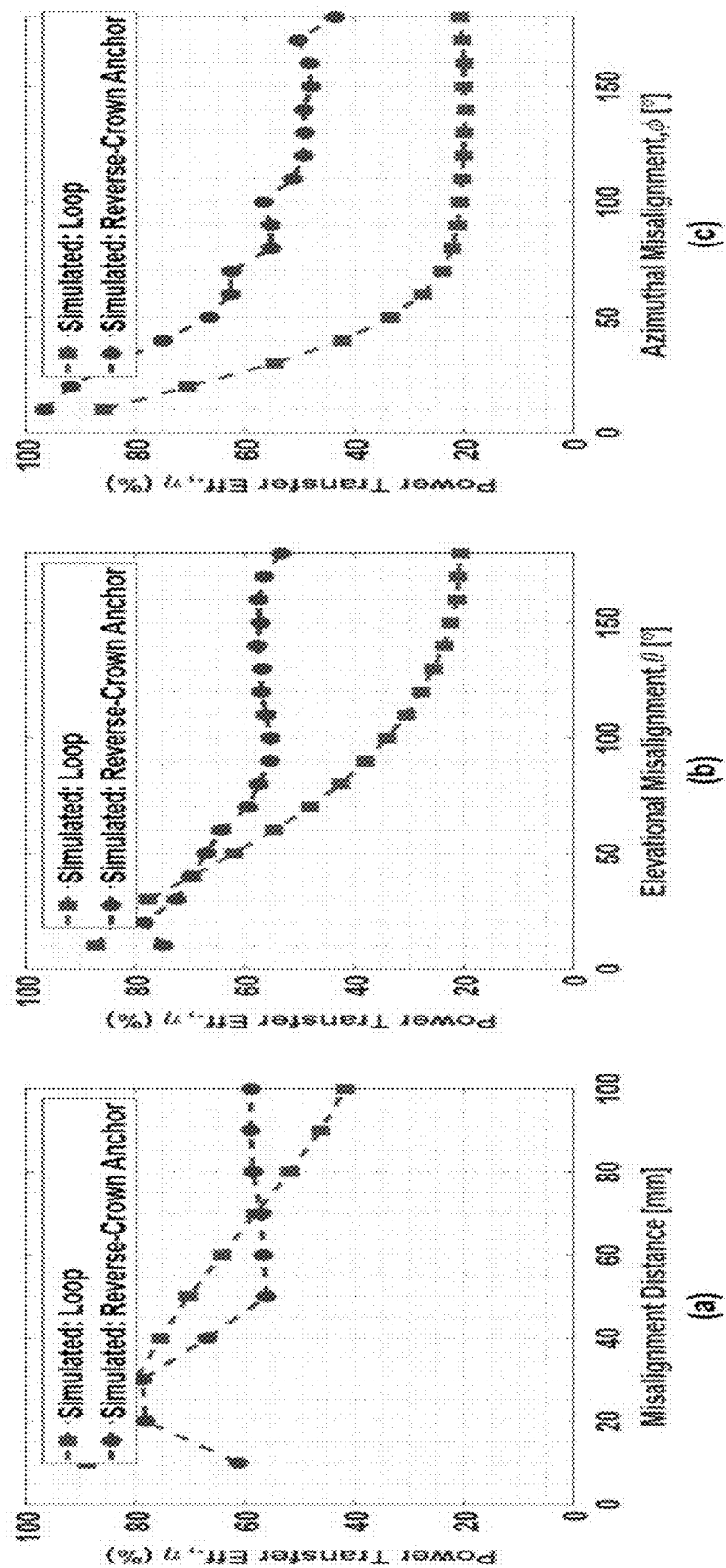
FIGS. 10(a)-(c) are plot diagrams showing comparisons of results of power transfer efficiency of the antenna having a shape of a single loop with the results of power transfer efficiency of the antenna having a shape of a reverse-crown anchor under the effects of various lateral and angular positional misalignments, FIG. 10(a) showing the comparison of the results of power transfer efficiency of the antenna having a shape of a single loop with the results of power transfer efficiency of the antenna having a shape of a reverse-crown anchor under the effects of a lateral misalignment, FIG. 10(b) showing the comparison of the results of power transfer efficiency of the antenna having a shape of a single loop with the results of power transfer efficiency of the antenna having a shape of a reverse-crown anchor under the effects of an elevational angular misalignment, and FIG. 10(c) showing the comparison of the results of power transfer efficiency of the antenna having a shape of a single loop with the results of power transfer efficiency of the antenna having a shape of a reverse-crown anchor under the effect of an Azimuthal angular misalignment, according to an embodiment of the subject invention.

FIG. 7 (d) shows an antenna having an anchor shape with a reverse crown shank obtained by rotating the crowns of the generic anchor-shaped anchor by 180°. The results of the misalignments tests are shown in FIGS. 10(a)-(c), indicating that the power transfer efficiencies of the antenna formed with the reverse crown shank drop at rates much slower than that the conventional loop-shaped antenna, when either lateral misalignment, elevational angular misalignment, or Azimuthal angular misalignment are introduced.

Figures 7A, 7B, 7C, 7D, 7E, 7F, 7G, 7H, 7I, 7J:
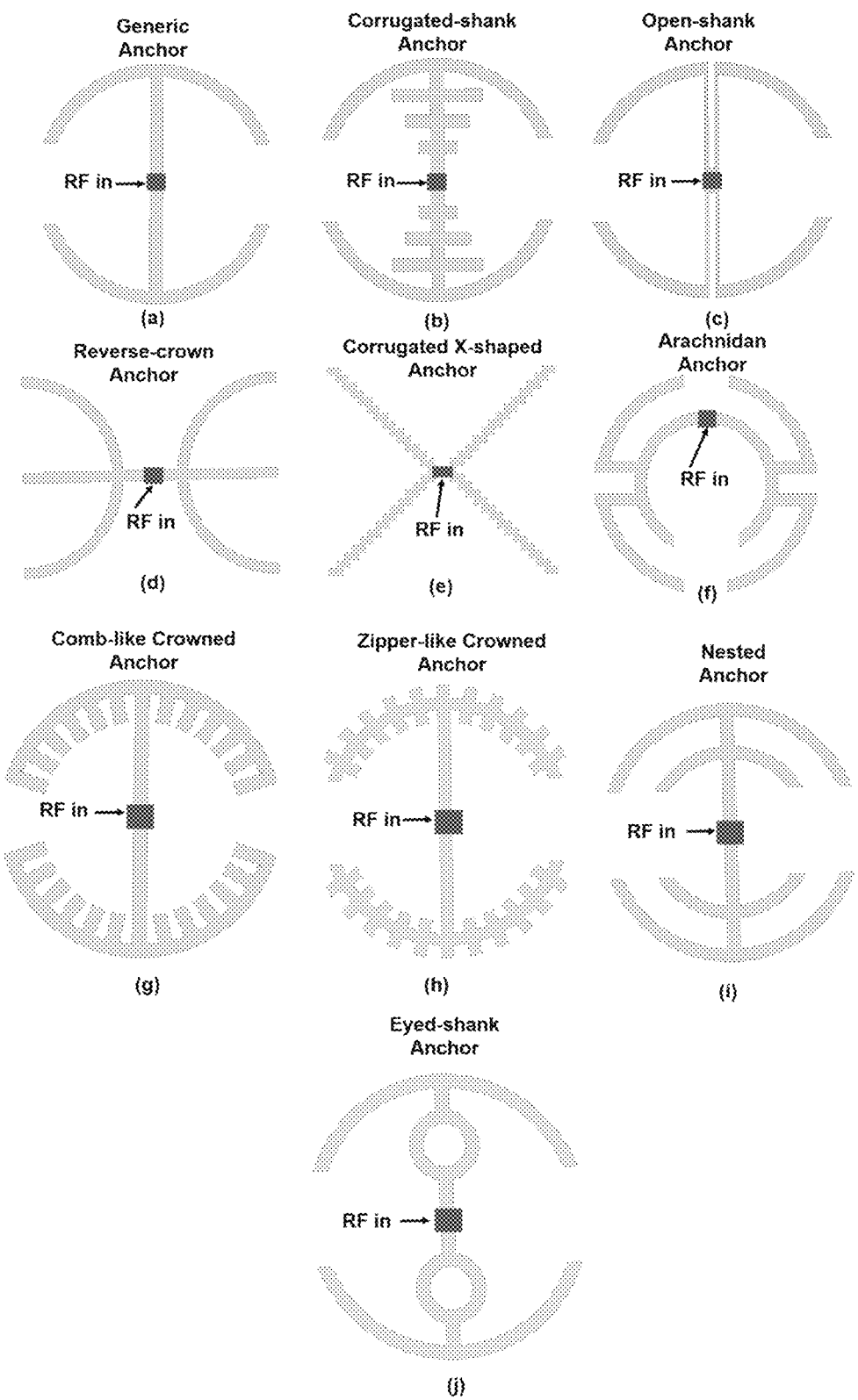
FIGS. 7(a)-(j) are schematic representations illustrating variants of anchor-shaped antennas for inhibiting effects of either lateral or angular positional misalignments of the antennas, FIG. 7(a) showing an antenna having a generic anchor shape, FIG. 7(b) showing an antenna having an anchor shape with a corrugated shank, FIG. 7(c) showing an antenna having an anchor shape with an open shank, FIG. 7(d) showing an antenna having an anchor shape with a reverse crown shank, FIG. 7(e) showing an antenna having an anchor with a corrugated X shape, FIG. 7(f) showing an antenna having an anchor with an arachnidan shape, FIG. 7(g) showing an antenna having an anchor with a comb-like crowned shape, FIG. 7(h) showing an antenna having an anchor with a zipper-like crowned shape, FIG. 7(i) showing an antenna having an anchor with a nested shape, and FIG. 7(j) showing an antenna having an anchor shape with an eyed shank, according to an embodiment of the subject invention.
Figures 11A, 11B, 11C:
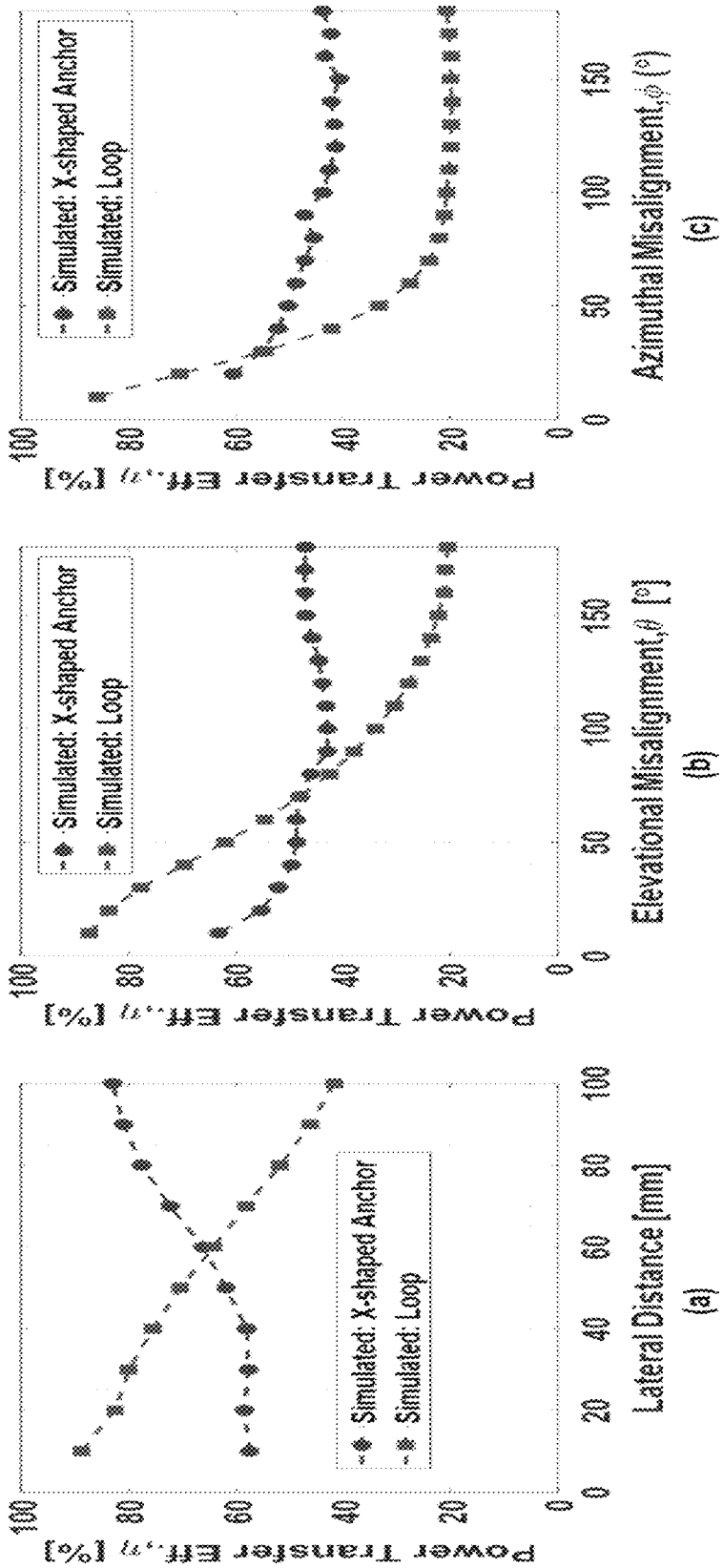
FIGS. 11(a)-(c) are plot diagrams showing comparisons of results of power transfer efficiency of the antenna having a shape of a single loop with the results of power transfer efficiency of the antenna having shape of a X-shaped anchor under the effects of various lateral and angular positional misalignments, FIG. 11(a) showing the comparison of results of power transfer efficiency of the antenna having a shape of a single loop with the results of power transfer efficiency of the antenna having a shape of a X-shaped anchor under the effects of a lateral misalignment, FIG. 11(b) showing results of power transfer efficiency of the antenna having a shape of a single loop with the results of power transfer efficiency of the antenna having shape of a X-shaped anchor under the effects of an elevational angular misalignment, and FIG. 11(c) showing results of power transfer efficiency of the antenna having a shape of a single loop with the results of power transfer efficiency of the antenna having shape of a X-shaped anchor under the effects of an Azimuthal angular misalignment, according to an embodiment of the subject invention.

FIG. 7(e) shows an antenna having an anchor with a corrugated X shape obtained by forming corrugations in both the shank and the crown of the anchor and by reducing the convexity angle of the crown. The results of the misalignments tests are shown in FIGS. 11(a)-(c), indicating that the power transfer efficiencies of the antenna formed with a corrugated X shape drop at rates much slower than that the conventional loop-shaped antenna, when either lateral misalignment, elevational angular misalignment, or azimuthal angular misalignment are introduced.

Figures 12A, 12B, 12C:
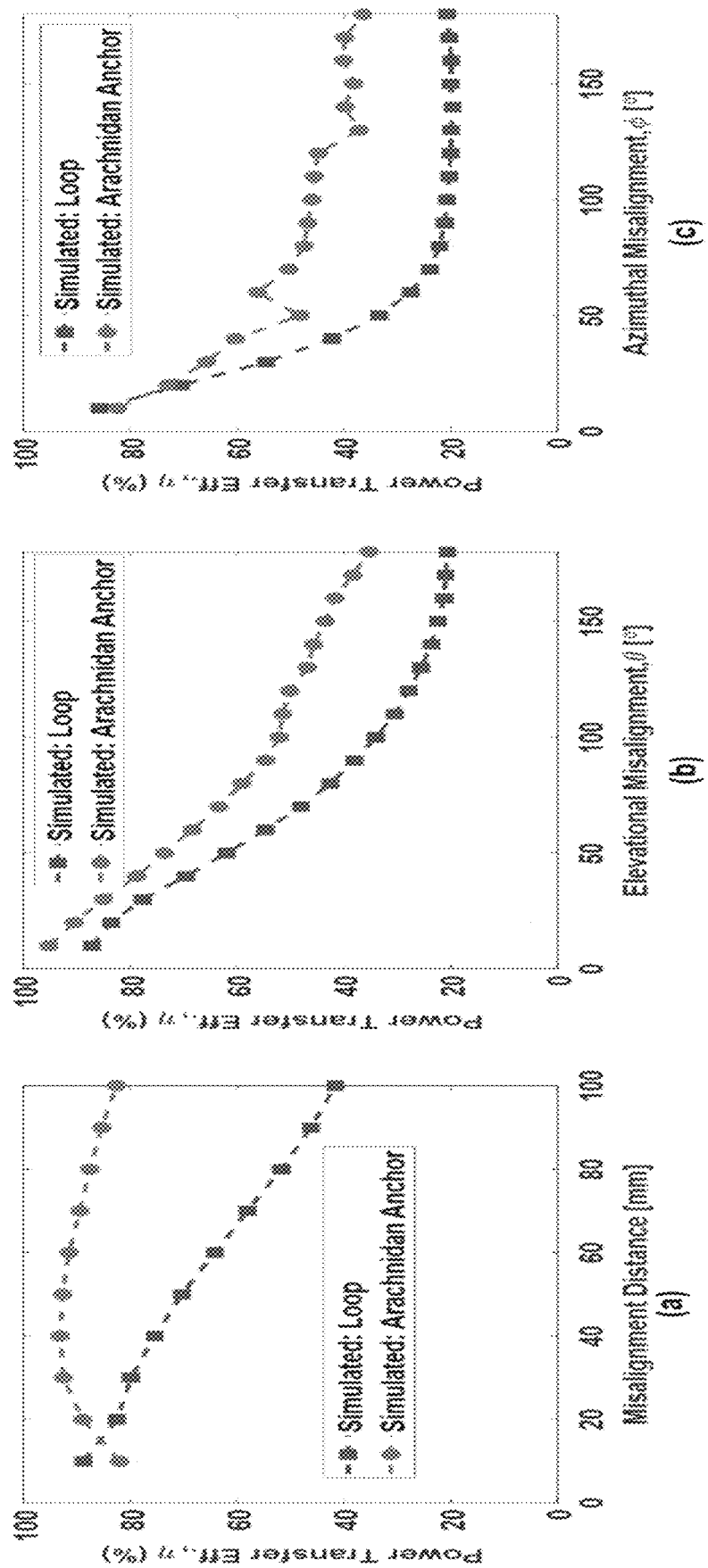
FIGS. 12(a)-(c) are plot diagrams showing comparisons of results of power transfer efficiency of the antenna having a shape of a single loop the results of power transfer efficiency of the antenna having a shape of an arachnidan anchor under the effects of various lateral and angular positional misalignments, FIG. 12(a) showing the comparison of the results of power transfer efficiency of the antenna having a shape of a single loop with the results of power transfer efficiency of the antenna having a shape of an arachnidan anchor under the effects of a lateral misalignment, FIG. 12(b) showing the comparison of the results of power transfer efficiency of the antenna having a shape of a single loop with the results of power transfer efficiency of the antenna having a shape of an arachnidan anchor under the effects of an elevational angular misalignment, and FIG. 12(c) showing the comparison of the results of power transfer efficiency of the antenna having a shape of a single loop with the results of power transfer efficiency of the antenna having a shape of an arachnidan anchor under the effects of an Azimuthal angular misalignment, according to an embodiment of the subject invention.

FIG. 7(f) shows an antenna having an anchor with an arachnidan shape (the term "arachnidan" is derived from the word "spider") obtained by forming a shape having shanks and crowns that mimics the corpulence of a spider. The results of the misalignments tests are shown in FIGS. 12(a)-(c), indicating that the power transfer efficiencies of the antenna formed with an arachnidan shape drop at rates much slower than that the conventional loop-shaped antenna, when either lateral misalignment, elevational angular misalignment, or Azimuthal angular misalignment are introduced.

FIG. 7(g) shows an antenna having an anchor with a comb-like crowned shape obtained by forming corrugations along the crowns of the anchor to slow the current down and eventually force the magnetic fields to stay in their vicinities and the ones at the extremities are responsible to enable fringing fields. The specific topology functions similarly to that of the generic anchor-shaped antenna in terms of the effects of misalignment upon the power transfer efficiencies.

FIG. 7(h) shows an antenna having an anchor with a zipper-like crowned shape which is an extension of that of antenna having the anchor with a comb-like crowned shape, where the corrugations are formed on both sides of the crowns. The performance of an antenna having an anchor with a zipper-like crowned shape is similar to that of the antenna having the anchor with a comb-like crowned shape antenna in terms of the effects of misalignment upon the power transfer efficiencies.

FIG. 7(i) shows an antenna having an anchor with a nested shape obtained by taking two anchors of different sizes and nesting them together to make a new one. The antenna having an anchor with a nested shape functions similarly to that of the generic anchor-shaped antenna in terms of the effects of misalignment upon the power transfer efficiencies.

FIG. 7(j) shows an antenna having an anchor shape with an eyed shank obtained by placing two circular shape ("eyes") on two sides of the shank, respectively. The antenna having an anchor with an eyed shank functions similarly to that of the generic anchor-shaped antenna in terms of the effects of misalignment upon the power transfer efficiencies.

Anchor-Shaped Antennas with Polygon-Shaped Outer Shells ("Crowns")

Referring to FIGS. 13(a)-(h), the anchor-shaped antennas can be configured to be formed with various polygonal shapes of outer shells ("crowns") for inhibiting the effects of lateral and angular positional misalignments upon the power transfer efficiencies.

Figures 13A, 13B, 13C, 13D, 13E, 13F, 13G, 13H:
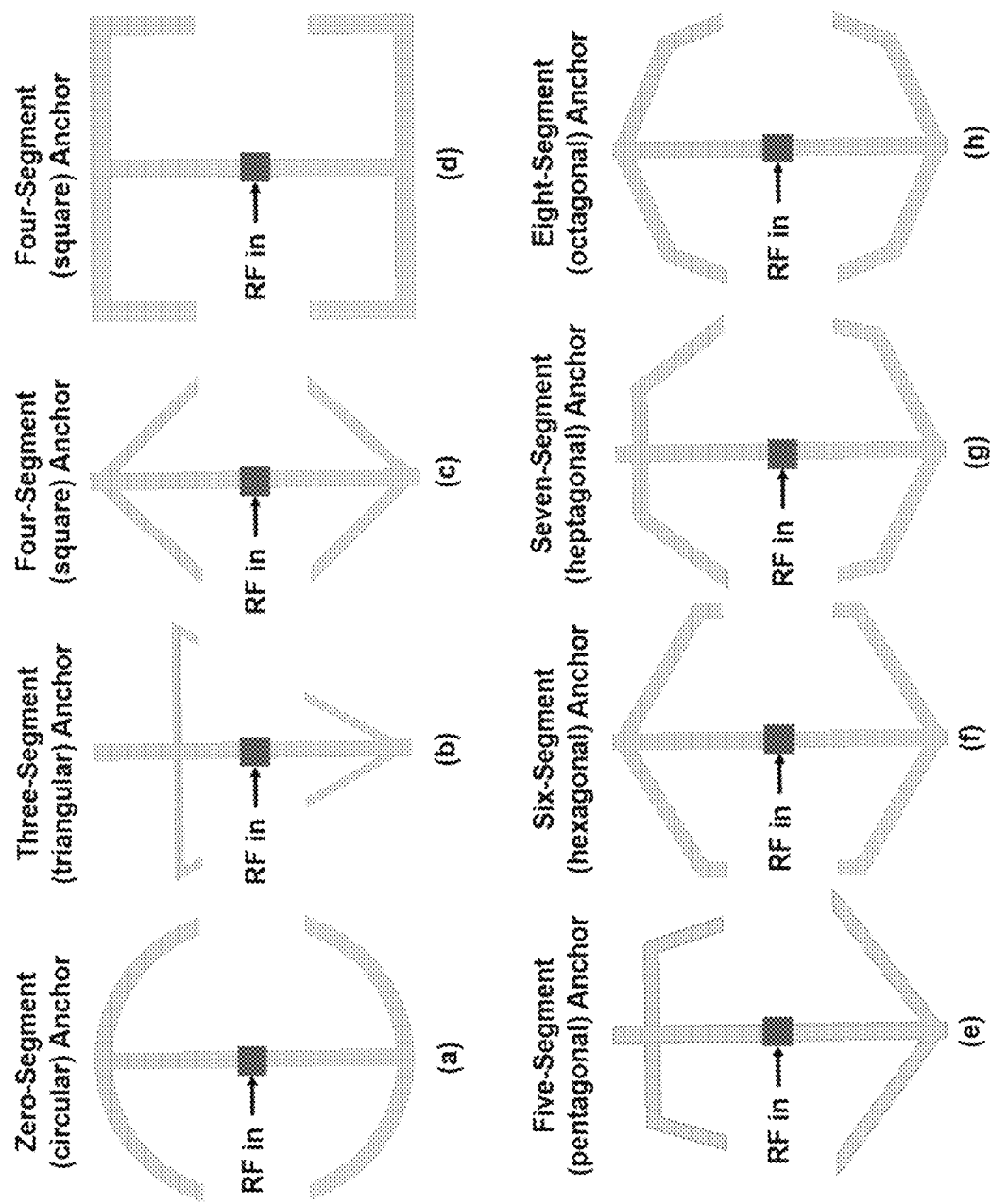
FIGS. 13(a)-(h) are schematic representations illustrating further variants of anchor-shaped antennas for inhibiting effects of either lateral or angular positional misalignments, FIG. 13(a) showing an antenna having a circle-like anchor shape of zero-segment, FIG. 13(b) showing an antenna having a triangle-like anchor shape of three-segment, FIG. 13(c) showing an antenna having a diamond-like anchor shape of four-segment, FIG. 13(d) showing an antenna having a square-like anchor shape four-segment, FIG. 13(e) showing an antenna having a pentagon-like anchor shape of five-segment, FIG. 13(f) showing an antenna having a hexagon-like anchor shape of six-segments, FIG. 13(g) showing an antenna having a heptagon-like anchor shape of seven-segment, and FIG. 13(h) showing an antenna having an octagon-like anchor shape of eight-segment, according to an embodiment of the subject invention.

In particular, FIG. 13(a) shows an antenna having a zero-segment (circular) anchor shape, FIG. 13(b) shows an antenna having a three-segment (triangular) anchor shape, FIG. 13(c) shows an antenna having a four-segment (diamond) anchor shape, FIG. 13(d) shows an antenna having a four-segment (square) anchor shape, FIG. 13(e) shows an antenna having a five-segment (pentagonal) anchor shape, FIG. 13(f) shows an antenna having a six-segment (hexagonal) anchor shape, FIG. 13(g) shows an antenna having a seven-segment (heptagonal) anchor shape, and FIG. 13(h) shows an antenna having an eight-segment (octagonal) anchor shape.

The performances of the antennas with various polygons-shaped outer shells ("crowns") is evaluated in order to understand if their performances are same as these of the circular crowns. A setup includes the transmitter antenna and the receiver antenna kept apart at a fixed distance of about 20 mm and the receiver antenna positioned with no misalignment from the transmitter antenna. Similarity in performance of the circular and polygonal shapes provides the misalignment resilience.

Figure 14:
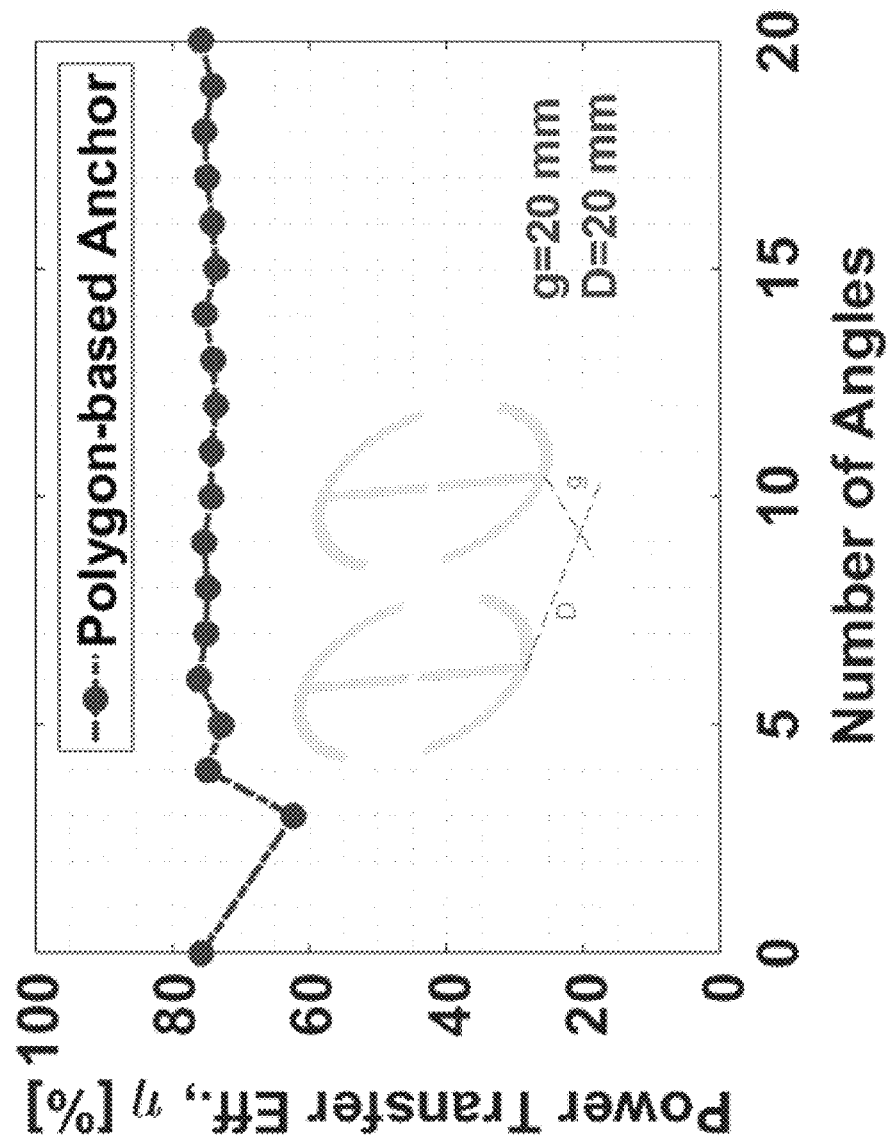
FIG. 14 is a plot diagram showing results of power transfer efficiency of the antenna having a polygon-like anchor shape with an increasing number of polygon sides, while assuming no misalignment between the antennas, according to an embodiment of the subject invention.

Referring to FIG. 14, it is found that regardless of the variations of polygonal shapes of the anchor-shaped antennas, the performance in term of the effects of lateral or angular misalignment upon power transfer efficiency is the same.

The wireless power transfer and harvesting systems of embodiments of the subject invention are advantageous for wearable applications due to their simplistic profile, high-power transfer efficiency, and positional misalignment resilience. In addition, the cost of fabricating the antenna integratable into textile is relatively low. The antenna can be implemented on chairs, backpack, couches, mattresses, bedsheets, necklace, bracelets, and even MRI structures.

As shown in FIGS. 2(a)-2(c) and FIGS. 3(a)-3(c), prototypes of the wireless power transfer and harvesting system are made of a pair of anchor-shaped antennas resonating at 360 MHz and conductive textiles embroidered into clothing and upholsteries. A harvesting circuit resonating at the same frequency is designed and inserted inside the receiving anchor-shaped antenna in FIG. 3(b). Three LEDs are integrated to the dress to light up when the wireless power transfer and harvesting system is powered. An input RF power of 1 watt is used for the experiment. The LEDs stay lit up when the mannequin with dress is tilted laterally and angularly with respect to the chair. As the LEDs require few milliwatts of power to operate, it suggests that any on-body device requiring a few milliwatts to operated can be implemented based on the wireless power transfer and harvesting system for smart dresses. Furthermore, because the input power is controlled, the on-body device is charged by adjusting the input power. Specific absorption rate (SAR) has been shown to be within the limits set by the Food and Drug Administration (FDA) when an input RF power of about 1 watt is used to excite the transmitter.

The misalignment test results show that the anchor-shaped antenna outperforms the conventional loop antenna when both are subjected to lateral or angular misalignments. For all the misalignment tests, a significant decay of power transfer efficiency is observed in the performance of the convention loop antenna. The high-efficiency performance observed in the anchor-shaped antenna regardless of the dimension or the resonant frequency is attributed to fringing fields resulted from having gaps on two opposite sides and the septum-shank of the anchor, making the geometry an excellent solution for overcoming misalignment effects upon the wireless power transfer and harvesting system.

Therefore, the wireless power transfer and harvesting system having anchor-shaped antennas is more resilient to misalignments of different degrees of freedom than conventional loop antenna for near-field applications. Moreover, for the same operation frequency, the anchor-shaped antenna structures are smaller in size as compared to the conventional loop antennas, enabling easy and seamless integration into smart clothing.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A wireless power transfer and harvesting system, comprising:
   a transmitter antenna for wirelessly transmitting power; and
   a receiver antenna operatively coupled to the transmitter antenna for receiving the power;
   at least one of the transmitter antenna and the receiver antenna being formed in a shape of an anchor,
   the shape of an anchor having exactly two semi-enclosing structures disposed diametrically opposite to each other,
   each semi-enclosing structure comprising exactly one central bar extending from a middle portion thereof toward the opposite semi-enclosing structure, a proximal end of the exactly one central bar of each semi-enclosing structure being connected to the respective semi-enclosing structure at exactly one contact point, and
   the exactly one central bar of each semi-enclosing structure comprising a radio frequency (RF) feed point on a distal end thereof opposite from the proximal end connected to the respective semi-enclosing structure.

2. The wireless power transfer and harvesting system of claim 1, the transmitter antenna receiving RF power from an external RF power generation device and wirelessly transmitting the RF power received to the receiver antenna receiving the RF power and supplying the RF power to a rectifier circuit, and the rectifier circuit converting the RF power into direct current (DC) power and supply the DC power to one or more external devices.

3. The wireless power transfer and harvesting system of claim 2, the rectifier circuit comprising a diode rectifier.

4. The wireless power transfer and harvesting system of claim 2, further comprising a power management circuit coupled to the rectifier and configured to regulate the DC voltage, stabilize the DC voltage, or both.

5. The wireless power transfer and harvesting system of claim 1, the shape of an anchor being configured to inhibit effects of: lateral positional misalignments of the transmitter antenna or the receiver antenna upon power transfer efficiency of the wireless power transfer and harvesting system; angular positional misalignments of the transmitter antenna or the receiver antenna upon power transfer efficiency of the wireless power transfer and harvesting system; or both.

6. The wireless power transfer and harvesting system of claim 1, the two semi-enclosing structures being formed as two semi-circular strips.

7. The wireless power transfer and harvesting system of claim 1, the two semi-enclosing structures having a same shape and a same size.

8. The wireless power transfer and harvesting system of claim 1, the two semi-enclosing structures being spaced apart from each other by a predetermined distance.

9. The wireless power transfer and harvesting system of claim 1, the at least one of the transmitter antenna and the receiver antenna being configured to have an extended fringing field extending outside an aperture of said antenna.

10. The wireless power transfer and harvesting system of claim 1, the exactly one central bar of each semi-enclosing structure being a corrugated central bar.

11. The wireless power transfer and harvesting system of claim 10, the corrugated central bar having a plurality of corrugations formed along a length of the central bar.

12. The wireless power transfer and harvesting system of claim 1, each semi-enclosing structure having a polygonal shape.

13. The wireless power transfer and harvesting system of claim 12, the two semi-enclosing structures having a same shape and a same size.

14. The wireless power transfer and harvesting system of claim 12, the two semi-enclosing enclosing structures having different shapes and different sizes.

15. The wireless power transfer and harvesting system of claim 1, the at least one of the transmitter antennas and the receiver antenna being configured to operate at a frequency in a range of from 350 megahertz (MHz) to 400 MHz.

16. A wireless power transfer and harvesting system, comprising:
   a transmitter antenna for wirelessly transmitting power; and
   a receiver antenna operatively coupled to the transmitter antenna for receiving the power;
   at least one of the transmitter antenna and the receiver antenna being formed in a shape of an anchor,
   the shape of an anchor comprising two semi-enclosing structures disposed diametrically opposite to each other,
   each semi-enclosing structure comprising a central bar extending from a middle portion of the corresponding semi-enclosing structure toward the opposite semi-enclosing structure, and
   each of the two semi-enclosing structures being formed with a fringe-enabling cavity at a distal end of the central bar.

* * * * *